United States Patent [19]

Kalmus

[11] 3,733,581

[45] May 15, 1973

[54] ACOUSTIC DOPPLER WAVE RECOGNITION

[76] Inventor: Henry P. Kalmus, 3000 University Terrace, N.W., Washington, D.C. 20016

[22] Filed: Aug. 17, 1971

[21] Appl. No.: 172,460

[52] U.S. Cl. ............... 340/1 R, 340/3 D, 340/258 A
[51] Int. Cl. .......................... G01s 9/66, G08f 13/16
[58] Field of Search ................. 340/3 D, 258 A, 1 R; 343/7.7, 8

[56] References Cited

UNITED STATES PATENTS

| | | | |
|---|---|---|---|
| 2,655,645 | 10/1953 | Bagno | 340/3 D |
| 3,550,070 | 12/1970 | McLeod, Jr. | 340/3 D |

*Primary Examiner*—Richard A. Farley
*Attorney*—Harry M. Saragovitz et al.

[57] ABSTRACT

A moving body indicator for detecting movement of bodies in the presence of clutter noise which utilizes ultrasonic waves as a communicating means and a metallized foil electret transducer as a receiver and/or transmitter. The system uses the Doppler phenomenon to generate a signal that is a function of the relative velocity between the transmitter and the body. Another signal is simultaneously generated that is also a function of the relative velocity but has its phase shifted by a fixed amount. The two signals are fed to a correlator which will produce a voltage that is proportional to the velocity of the body and whose polarity is dependent on the direction of the velocity of the body with respect to the body indicator system. The voltage signal is also used to actuate an alarm as an indicator of intrusion or movement of a body.

13 Claims, 11 Drawing Figures

Patented May 15, 1973 3,733,581

INVENTOR,
HENRY P. KALMUS
BY
Harry M. Saragovitz
Edward J. Kelly
Herbert Berl
Saul Elbaum

ATTORNEYS

INVENTOR,
HENRY P. KALMUS

BY Harry M. Saragovitz
Edward J. Kelly
Herbert Berl
Saul Elbaum

ATTORNEYS

ACOUSTIC DOPPLER WAVE RECOGNITION

RIGHTS OF THE GOVERNMENT

The invention described herein may be manufactured, used, and licensed by or for the United States Government for governmental purposes without the payment to the inventor of any royalty thereon.

BACKGROUND OF THE INVENTION

This invention relates to moving body indicators, intrusion detectors, burglary alarm systems, and more particularly to moving body detectors for use in environments where electromagnetic wave systems are impractical.

The detection of moving bodies is usually based on the recognition of an electromagnetic Doppler wave. In its simplest form the device used for this purpose consists of a continuous electromagnetic wave transmitter and an electromagnetic wave receiver in which the reflected wave is superimposed on part of the emitted wave. After rectification, energy at the Doppler frequency is obtained. Such devices have receivers which respond to energy waves in a collimated beam, that is, the illuminated area greatly decreases as the distance from the receiver increases. Furthermore, such devices are not suited for use in spatial inclosures, such as rooms and corridors, which are not electromagnetically shielded because such waves from radio transmissions, additional transmitters, and other such sources may cause false signals in the detector. Moreover, the receiver of such devices cannot discriminate between background signals outside of the ideal solid cylindrical space to be monitored and actual moving body signals inside the spatial inclosure in which the device is used. Likewise, such systems cannot discriminate between clutter signals on or near the axis of the monitored space and actual moving body signals.

Other arrangements in use today include systems which utilize infrared, visible, or ultraviolet light as the communicating means between the transmitter and receiver. Such systems, however, base the detection of moving bodies on the interruption of the light beam transmitted from a source directly to the receiver. Thus, an additional drawback is that a separate transmitter and receiver are required to be carefully aligned prior to use. Moreover, such devices must utilize expensive lenses as a part of the optical transducer assembly needed for the system. Furthermore, such systems have too narrow an area of sensitivity because of the small size of the beam utilized. Larger diameter beam areas would be out of the question because the large size of the lenses required would make the device impractical costwise. Moreover, such optical systems are easily recognizable in the dark. In the case of invisible light, the source and detecting lenses still must be exposed for operation of the system.

All acoustic systems in use today have extremely wide angles of directivity. This aspect of these systems provides coverage of excessively large areas and therefore frequently result in false signals due to pets and mechanical objects in motion in the sensitive space. A case in point is sonar. In sonar it is extremely difficult to distinguish between large animals and vessels. Furthermore, without actually determining coordinates it is difficult to monitor a given spatial corridor because the nature of system is such that acoustic waves originating outside of a desired monitoring corridor may cause false signals. Furthermore, such systems cannot discriminate between actual moving body signals and background signals from sources uniformly distributed with respect to the angle of incidence into the transducer. These systems cannot discriminate against clutter interference and sometimes read clutter as a moving body signal.

This invention solves all of the inherent disadvantages exhibited by the foregoing described systems without the use of radio or optical waves as a communicating means. The transducer element of this invention is unidirectional and emits a collimated beam approaching the diameter of the transducer when used as a transmitter. Furthermore, this transducer element is quite inexpensive and can easily be used in parallel with many others. The transducer element is also considerably more rugged than those of theforegoing systems and its unique design does not require a power source. Moreover, it is compact and its sensitivity range extends forward in a collimated beam when used as a receiver. The necessity for careful alignment of transmitter and receiver is eliminated. This effectively eliminates false Doppler signals due to clutter. In so doing this system assures an accuracy unapproached by any of the aforementioned prior art. Hitherto, no effective means for detecting intruding bodies and yet discriminate signals from pets and other household objects was available. What was needed was a special kind of communicating means which could be easily collimated and directed and yet operate correctly when other systems in adjacent apartments or spatial inclosures function concurrently.

It is, therefore, an object of this invention to provide a moving body indicator that can function in unshielded separated living inclosures and spaces within buildings without false signal indication from external sources or sources in adjacent partitioned living areas.

Another object of this invention is to provide a moving body indicator that utilizes ultrasonic energy waves as the communicating means between the transmitter and receiver via the observed body.

It is yet an additional object of this invention to provide a moving body indicator which utilizes an ultrasonic Doppler detection system.

It is still an additional object of this invention to provide a moving body indicator that will not give false signals due to pets, mechanical objects, electrical devices, et cetera, functioning in the proximity of the device.

It is also another object of this invention to provide a moving body indicator that uses a self-powered foil electret transducer as a receiver.

An additional object of this invention is to provide a moving body indicator that will reject clutter interference.

Another object of this invention is to provide a moving body indicator that will distinguish between approaching and receding bodies using ultrasonic energy waves as a means of communication between transmitter and receiver via the observable body.

Yet another object of this invention is to provide a moving body indicator which does not require careful alignment of transmitter and receiver.

These and other objects of this invention will become more fully apparent with reference to the following specification and drawings which relate to several preferred embodiments of this invention.

SUMMARY OF THE INVENTION

Briefly, in accordance with this invention, an ultrasonic Doppler system is provided which makes possible the detection of moving bodies in the presence of clutter noise. The system is based on the use of ultrasonics, quadrature detection, low leverl correlations, a unidirectional metallized-foil electret ultrasonic transducer, and an alarm signaler. The correlator consists of two coils, one fixed and the other attached to a piezoelectric strip. When the coils bend the strip in one direction it produces a positive voltage and when bent in the other, a negative voltage. Of course, an electrical correlator may be utilized in function instead of the mechanical means described. In order to reject clutter interference most of the required amplification occurs after correlation and integration so that amplifier overloading is avoided. A voltage signal after integration actuates the alarm. The metallized-foil electret transducer is used as receiver and comprises a thin sheet of polymer (for example Teflon) electret coated with a layer of metallization and stretched over a backing plate which is connected to an electrode. Ultrasonic waves impinging on the foil cause it to vibrate and change the capacitance between the metallization layer of the electret and the backing plate. the transducer is designed so that its electret diaphragm responds principally to pressure waves along its principal normal axis.

BRIEF DESCRIPTION OF DRAWINGS

The specific nature of the invention as well as other objects, aspects, uses, and advantages thereof will clearly appear from the following description and from the accompanying drawings in which.

DESCRIPTION OF THE PREFERRED EMBODIMENT

Figure 2:
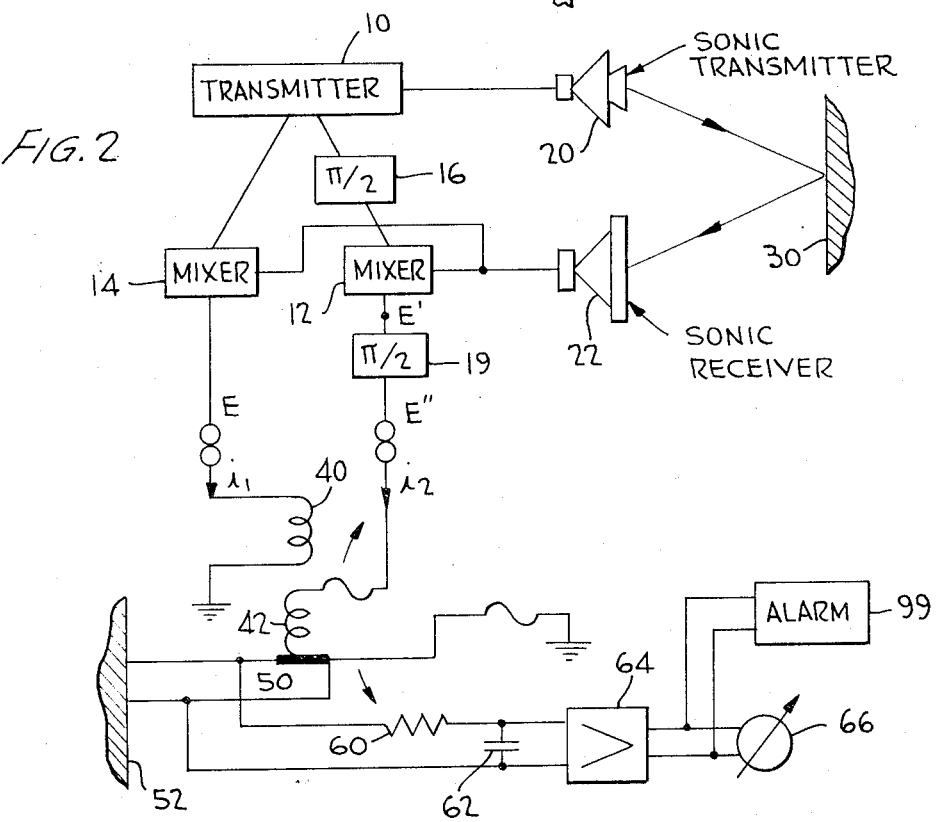
FIG. 2 is a schematic circuit representation of an embodiment of a moving body indicator in accordance with this invention.

FIG. 2 is a schematic circuit representation of an embodiment of the invention which utilizes ultrasonic horns as plane-wave transmitting means, metallized-foil electret transducers as receiving means and quadrature detection as a means for distinguishing between approaching and receding bodies.

In this embodiment of the invention an ultrasonic wave is transmitted by an ultrasonic horn 20 to a moving body 30. The ultrasonic wave is reflected from the moving body 30 and received by the transducer 22.

Figure 1:
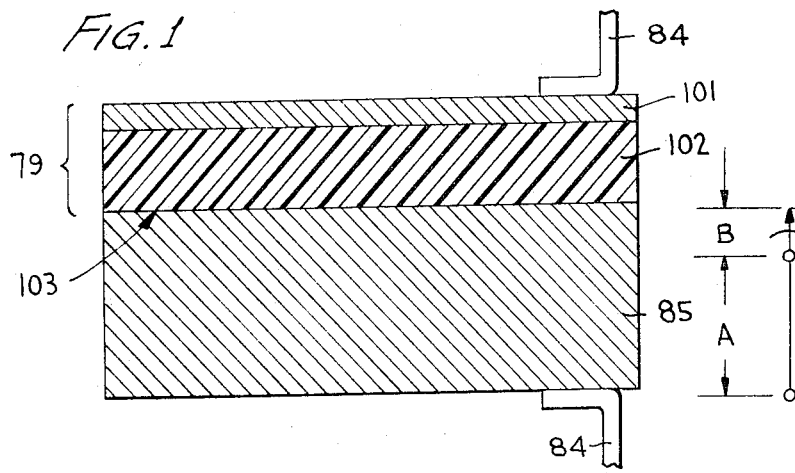
FIG. 1 is a cross-section of a metallized-foil electret transducer.

The receiver transducer 22 illustrated in detail in FIG. 1 comprises a thin polymer foil 102 which is permanently charged with electricity such that one side of the foil has fixed charges of positive polarity therein and the other side of the foil has fixed charges of negative polarity therein. The foil is coated with a thinner layer of conductive metal 101 and is stretched across a conductive metal backing plate 85. The transducer 22 further comprises the permanently polarized and metallized polymer foil or electret 79 appositioned to backplate 85 where in between a thin layer 103 (about 1 micron) of air is formed. This thin layer 103 provides a compliant region in the transducer structure in FIG. 1. Ultrasonic pressure waves impacting the transducer deform the electret 79 and compress the air layer 103 causing a change in the capacitance between the back plate 85 and metal layer 101.

The metallized-foil electret 79 which serves as a diaphragm requires exposure to the ultrasonic field. When the diaphragm is deformed by ultrasonic waves restoring forces are created because of the stiffness and tension of the electret.

The metallized-foil electret 79 is typically ½ mil thick polymer film, charged with an electron-beam method. This method is specified by G. M. Sessler and J. E. West, J. Polymer Science, Part B, Number 7, pages 367–370, 1969.

The open-circuit voltage V generated by metallized-foil electret transducer in response to air born sound is given by:

$V = (4\pi)^2 \sigma t\ c\ \lambda/\epsilon A$ where $\sigma$ is the effective surface-charge density of the metallized electret foil 79, $t$ is the average spacing of positive and negative charges, $C$ is the capacitance of the transducer as measured between the electrical contacts 84, $x$ is the deflection of the metallized electret foil 79 from its quiescent position, $\epsilon$ is the dielectric permittivity of the foil portion of the metallized-foil electret 79, and $A$ is the area of the portion of metallized foil electret which vibrates, i.e., the diaphragm area.

Referring again to FIG. 2, the returned signal from the receiver is fed into mixers 12 and 14. Between the transmitter 10 and mixer 12 there is a delay network 16 to delay the signal from the transmitter to the mixer by $\pi/2$. A second delay circuit 19 is connected between the output of mixer 12 and the coil 42. The output of mixer 14 is connected to coil 40.

Figure 3:
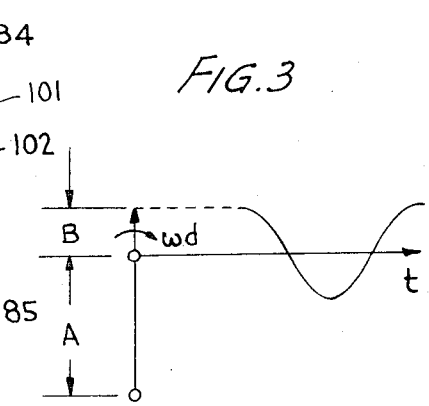
FIG. 3 is a phasor diagram used to explain the operation of this invention.

Coils 40 and 42 along with a bimorph piezoelectric strip 50 comprise an electromechanical correlator 52. Coil 40 is fixed in position and coil 42 is attached to the strip 50. If the strip is bent in one direction by the forces produced between the coils it produces a positive voltage, and if bent in the other direction a negative voltage. The signal produced by the electromechanical correlator is integrated by resistor 60 and capacitor 62 and fed through a D-C amplifier to phasemeter 66 and to alarm 99. During operation, a signal $A \cos \omega_1 t$ is emitted from transmitter 10 and the wave $B \cos (\omega_2 + \phi)$ is reflected. If $\phi = 0$ the conditions are shown in the phasor-diagram of FIG. 3. For a receding body $\omega_2$ is smaller than $\omega_1$. If an increasing phase angle is denoted by counterclockwise rotation, B will rotate clockwise with an angular velocity $\omega_d=\omega_1-\omega_2$. After the signals are mixed in square-law device 14 we obtain $(A \cos \omega_1 t + B \cos \omega_2 t)^2 = A^2 \cos^2 \omega_1 t + B^2 \cos^2 \omega_2 t + 2AB \cos \omega_1 t \cos \omega_2 t$ The last term, the only one of present importance, is equal to $AB \cos (\omega_1-\omega_2)t + AB \cos (\omega_1+\omega_2)t$ The first term $E = AB \cos \omega_d t$ contains the difference frequency and represents the mixer 14 output. Because it is a cosine term, the projection of $B$ on $A$ along the time-axis supples the shape of the Doppler wave. It can easily be seen that the same Doppler wave is obtained whether $B$ rotates clockwise or counterclockwise. In other words, the mixer output is the same for receding or approaching bodies and bodies with reciprocating motion will be essentially indistinguishable from bodies with unidirectional motion.

Figure 4:
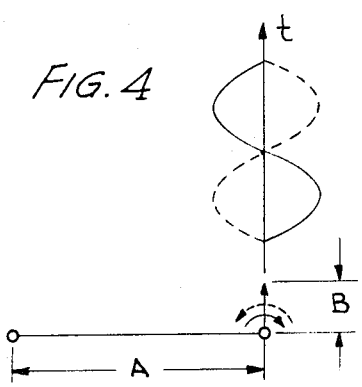
FIG. 4 is a phasor diagram wherein the local signal is delayed in the circuit of FIG. 2.
Figure 5:
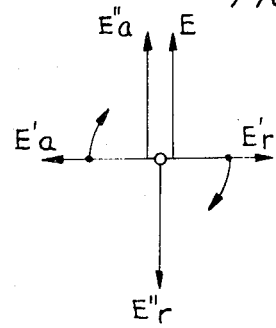
FIG. 5 is another phasor diagram used to explain theoperation of the circuit of FIG. 2.

The second mixer 12 has the local signal delayed by $\pi/2$ in delay network 16 and the return wave from antenna 22 fed to it as before. The B phasor is again vertical, but the $A$ phasor appears in the horizontal position as shown in FIG. 4. Compared with FIG. 3, there is an important difference: For receding bodies the wave is delayed by $\pi/2$ and for approaching bodies it is advanced by $\pi/2$, Mathematically:

For receding bodies: $\omega_{dr}=(\omega_1-\omega_2)=\omega_d$. Denoting the mixer 12 output $E'$, $E'r = AB \cos (\omega_d t - \pi/2)$.

For approaching bodies: $\omega_{d3} = -\omega_d$.

The correlator 52 is fed by currents $i_1$ and $i_2$ derived from waves $E$ and $E''$, where $E''$ is derived from $E'$ through a second delay network.

$E'' = E'_e - j\pi/2$
$E''_r = AB \cos (\omega_d t - \pi)$
$E''_a = AB \cos \omega_d t$ The above conditions being shown in the phasor diagram of FIG. 4.

Comparing the $E$ wave with the $E''$ wave, we notice that for approaching bodies the waves are in phase. For receding bodies, they are in opposition. Hence, the correlator 52 will supply a positive voltage for in-phase inputs and a negative voltage for out-of-phase inputs.

Clutter can be suppressed by introducing an appropriate integration network following the correlator, such as the RC network shown in FIG. 2 consisting of resistor 60 and capacitor 62. Operation of correlator 52 is linear in the ranges desired and it is a "real" multiplier; one wave alone will not produce any output. Additionally, it works at a very low input level. Preferably the coils 40 and 42 of the correlator should be driven from constant current generators such as pentodes or solid-state devices with small gain, so that overloading is avoided.

In FIG. 2, the use of two phase shifters, one for the local high-frequency wave and the other for the mixer output, may not be understood.

It may seem that a single phase shifter with twice the delay should serve the same purpose; this objection is based on the fact that in a superheterodyne receiver it is irrelevant whether a phase shift is introduced before or after the mixer since the result is the same. This is correct as long as the difference frequency $\omega_d$ does not change its sign. In our case, however, $\omega_d$ can be positive or negative. Hence, as shown before, the first phase shifter 16 produces a delay of the mixer output for receding and an advance for approaching bodies. The second phase shifter 19 produces a delay, independent of body motion.

The embodiment of FIG. 2 has two drawbacks. First, the second phase shifter 19 has to produce the $\pi/2$ delay over a wide range of frequencies and second, the correlator output is a small D-C voltage, and D-C amplification with high sensitivity presents difficulties. In addition, the correlator will also produce an interfering offset voltage.

Figure 6:
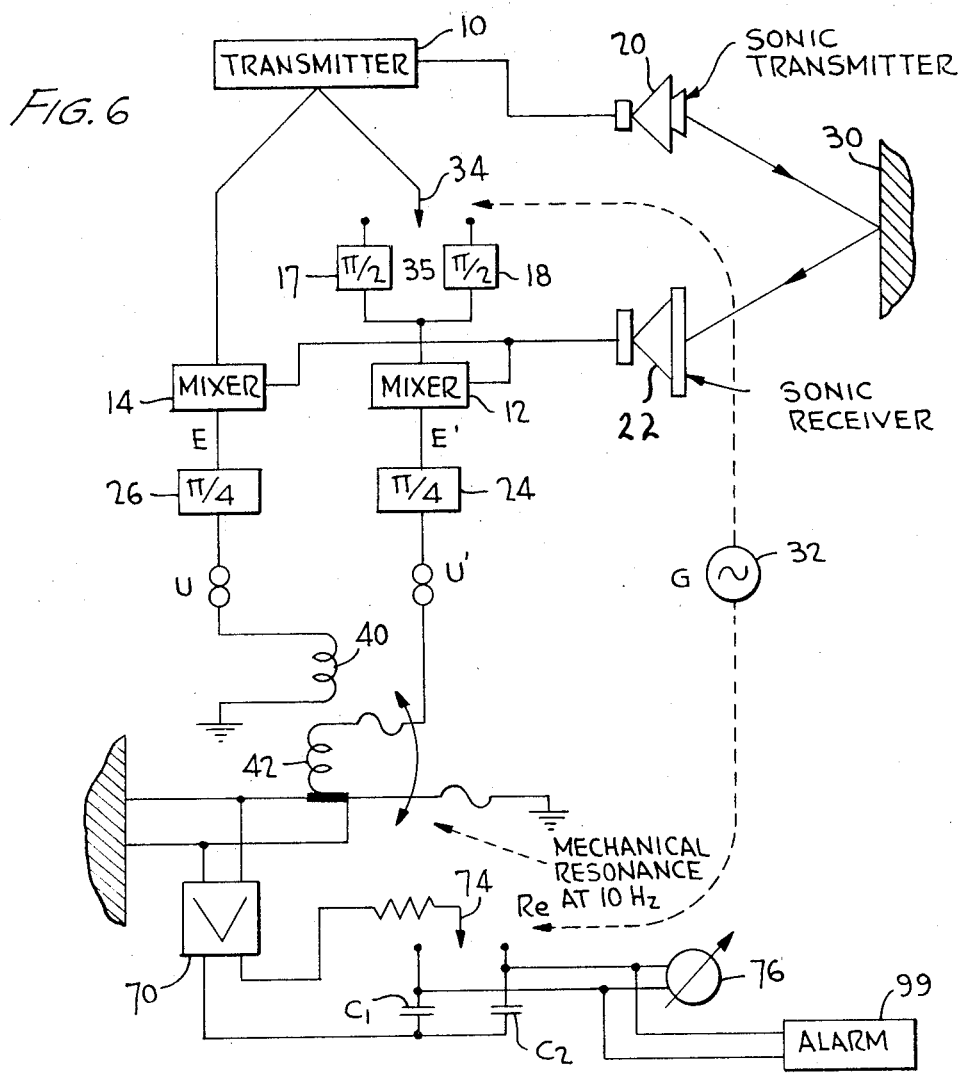
FIG. 6 is a schematic circuit diagram of another embodiment of a moving body indicator in accordance with this invention.

Another embodiment of this invention that avoids both of these drawbacks is shown in FIG. 6. There, the single delay network 19 in the $E'$ branch of FIG. 2 is replaced by two $\pi/4$ networks 24 and 26, one producing a delay in the $E'$ branch and the other producing an advance in the $E$ branch. The delay network 16 of FIG. 2 is replaced by a phase shifter 35 that will alternately produce a shift of $+\pi/2$ and $-\pi/2$ at a predetermined rate smaller than the lowest expected Doppler frequency. Phase shifter 35 consists of two networks 17 and 18 inserted alternately by a switch 34 driven from a 10 Hz. generator 32. In addition the A-C output from amplifier 70 is fed to a phase-sensitive rectifier Re which consists of generator driven switch 74 and capacitors C1 and C2.

The phase shifter difficulty is avoided with the replacement and insertion of the two $\pi/4$ networks 24 and 26. Denoting the output of the two phase shifters 24 and 26, U' and U and assuming that $E'$ and $E$ are in phase, it will be shown that U' and U have a phase difference of $\pi/2$ for all frequencies.

Figure 7:
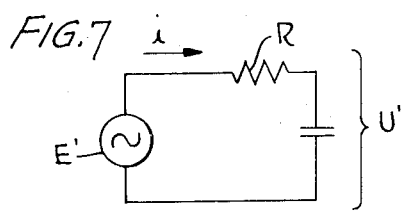
FIG. 7 is an equivalent circuit diagram for a signal produced within the moving body indicator of FIG. 6.

In FIG. 7, the network is shown for $E'$.

$$i = \frac{E'}{R+\frac{1}{j\omega C}} = E' \frac{j\omega C}{1+j\omega RC}; \quad U' = \frac{1}{j\omega C} i = E' \frac{1}{1+j\omega RC}$$

Figure 8:
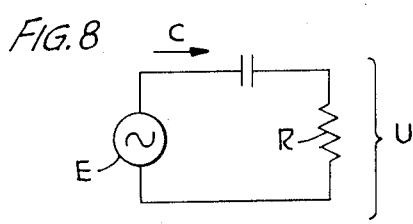
FIG. 8 is another equivalent circuit diagram for a signal produced during the operation of the moving target indicator of FIG. 6.

In FIG. 8, the network is shown for E.

$i = E j\omega C/1+j\omega RC;\ U = Ri = E j\omega RC/1+j\omega RC$

Denoting the phase shifts for $U'$ by $\phi_1$ and for $U$ by $\phi_2$, we obtain:

$\tan \phi_1 = -\omega RC$ ; $\tan \phi_2 = 1/\omega RC$

Figure 9:
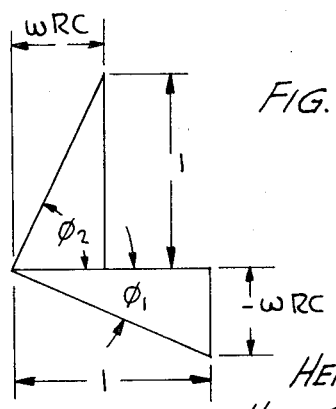
FIG. 9 is a graph illustrating a trigonometric relationship and is used to explain the operation of the circuit in FIG. 6.

This trigonometric relationship is shown in FIG. 9, and it can be seen that $|\phi_1+\phi_2|=\pi/2$, If, therefore, $E'$ and $E$ are out of phase by $+\pi/2$, $U'$ and $U$ will be in or out of phase for all body speeds. To maintain the signal-to-noise ratio for the device, it would be desirable to keep the product $UU'$ constant for all frequencies. It can be shown that, although the frequency dependence is not actually zero, it is acceptably small over a suitably wide range of frequencies.

$$\bar{u}' = \frac{1}{\sqrt{1+(\omega RC)^2}}; \quad \bar{U}\bar{U}' = \frac{\omega RC}{1+(\omega RC)^2};$$

$$\bar{U} = \frac{\omega RC}{\sqrt{1+(\omega RC)^2}}$$

Now if RC is chosen equal to $1/\omega_o$ ($\omega_o$ being the most probable Doppler frequency) we can write:

$$\omega = \omega_0 + \Delta\omega; \quad \bar{U}\bar{U}' = \frac{1+\frac{\Delta\omega}{\omega_0}}{1+\left(1+\frac{\Delta\omega}{\omega_0}\right)^2}$$

Figure 10:
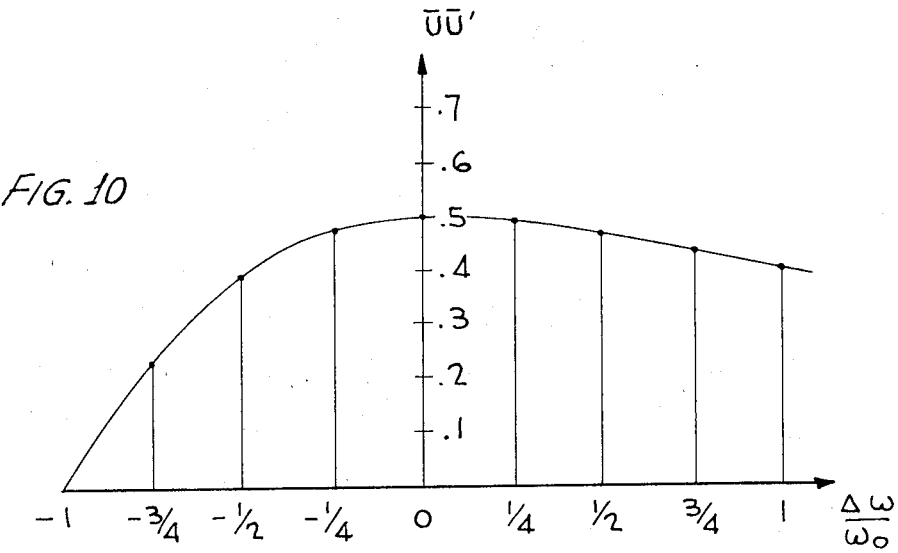
FIG. 10 is a plot of voltage versus frequency used to explain the operation of the circuit of FIG. 6.

In FIG. 10, UU' is plotted versus $\Delta\omega/\omega_o$ and it can be seen that the product does not show significant variations even for Doppler frequencies varying by a factor of 4. If the phase shifter is designed so that $\omega_o = 1/RC$ and $\omega_o = 100$ Hz. the product is 0.5 for 100 Hz., 0.4 for 50 Hz., and 0.4 for 200 Hz.

The problem of D-C amplification and the interfering offset voltage are alleviated in the circuit of FIG. 6 by the substitution of the two phase shifters 17 and 18.

The voltage U is now, as the voltage E before, a continuous Doppler wave. In the embodiment of FIG. 2, E'' was a Doppler wave, with phase changing from 0 to $\pi$ with respect to E for approaching and receding bodies.

Figure 11:
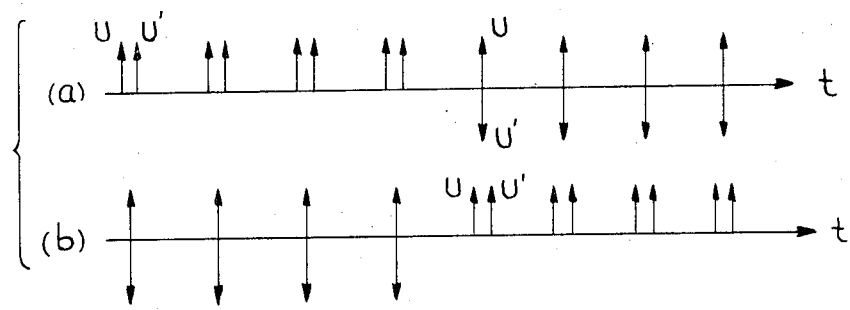
FIG. 11 illustrates the phase conditions of the Doppler waves during the operation of the circuit of FIG. 6.

In the instant embodiment, U' is again a Doppler wave whose phase, however, alternates between 0 and $\pi$ at the switching rate of 10 Hz. as shown in FIG. 11. Assuming eight Doppler cycles for a complete switching period, FIG. 11a shows the condition for an approaching body. While the switch 34 is at the left, E'' is in phase with E. While the switch 34 is at the right, the voltages are in phase opposition. Hence, we obtain first attraction of the two coils 40 and 42 and then repulsion. In FIG. 11b we see the conditions for a receding body. We obtain now first repulsion and then attraction.

The voltage delivered by the piezoelectric element 50 is proportional to the force. It is a wave at switching frequency whose phase reverses with respect to the output from generator 32. If the body reverses its direction, amplifier 70 is now a stable A-C amplifier with output detected in the phase-sensitive rectifier Re. There are now two means of integration: First, the piezoelectric element together with the movable coil is resonant at 10 Hz.; second, electric integration is derived from the RC network feeding meter 76.

In parallel with meter 76 is an alarm 99. Alarm 99 is actuated by a predetermined output from the RC network feeding meter 76.

If the A-C method according to FIG. 6 is chosen, it is necessary either to design a balanced structure of the correlator so that mechanical vibrations of the support do not create excessive noise signals in the 10-Hz. frequency range, or to isolate the correlator acoustically from its surroundings.

As can be seen from the foregoing specifications and drawings, the moving body indicator in FIGS. 2 and 6 incorporating ultrasonic waves as a communicating means, a self-powered metallized foil electret transducer as a receiving means, an ultrasonic horn as a transmitting means, and a clutter discriminating means, provides a new and novel moving body indicator with features and properties heretofore unattainable in the art, particularly in electronic intrusion devices, detectors, and alarm systems. Moreso, it is evinced that this invention teaches that ultrasonic waves can be reflected and absorbed by physical structures such as walls and other partitions commonly used in buildings and that ultrasonic waves can also be reflected from moving bodies. It also teaches that energy transmitters that can illuminate a physically enclosed space, such as heretofore described, with ultrasonic waves, are described and specified in the referable art. Moreover, it shows that ultrasonic wave foil electret transducers with high collimation in the direction of the principal axis of a solid cylindrical space are described and specified in the referable art. Range sensitivity is provided by the use of pulse techniques and frequency modulation. Attenuation of clutter created by low amplitude movements of other small nearby objects such as fans, clocks, et cetera, in the inclosure is provided by range sensitivity and by balancing. As further evinced by the foregoing, improvement is obtained by providing an ultrasonic energy source as a transmitter and a highly directional ultrasonic transducer as a receiver and by providing range sensitivity in the receiver.

It is to be understood that this invention is not to be limited to the exact details of construction shown and described, for obvious modifications will occur to a person skilled in the art.

What is claimed is:

1. A moving body indicator which will distinguish between approaching and receding bodies comprising:
   a. a transducing means for transmitting an ultrasonic signal at a certain frequency,
   b. a transducing means for receiving the reflected portion of said transmitted signal from a body, one of said transducing means comprising an electrically charged polymer foil, a thin coating of metal on one side thereof to which an electrode is attached, a metal plate forming a backing for said foil, and an electrode attached to said metal plate.
   c. first mixing means for deriving a Doppler signal which is the difference in frequency between the transmitted and received signals, first phase shifting means for shifting the phase of said transmitted signal from said transmitting means by a predetermined amount,
   d. second mixing means for driving a Doppler signal which is the difference in frequency between the transmitted signal phase shifted by a predetermined amount and the received signal,
   e. second phase shifting means for shifting the phase of the output signal from said second mixing means by a predetermined amount,
   f. correlating means for comparing the signals produced by said first mixing means and said second phase shifting means and which will produce a signal of one polarity when said compared signals are out of phase and of the opposite polarity when said signals are in phase,
   g. measuring means connected to the output of said correlator to determine whether the signals compared by said correlator means are in phase or out of phase.
   h. alarming means connected to the output of said correlator means to give an alarm signal when said measuring means measures certain prescribed values.

2. The moving body indicator of claim 1 wherein the correlating means includes a first coil connected to the output of said first mixing means and fixed in position, a second coil connected to the output of said second phase shifting means and force measuring means to indicate whether the signals in said first and second coils cause the coils to attract or repel each other.

3. The moving body indicator of claim 2 wherein the force measuring means includes a bimorph piezoelectric element that is attached to the second coil and which will produce a signal of one polarity when the coils repel each other.

4. The moving body indicator of claim 3 wherein the first and second phase shifting means each delay the signal $\pi/2$.

5. The moving body indicator of claim 4 wherein the measuring means includes an integrating circuit to integrate the signal produced by the piezoelectric element, D-C amplifying means connected to the output of said integrating circuit and meter means connected to measure the output of said D-C amplifier.

6. The moving body indicator of claim 5 wherein the integrating circuit is and RC circuit.

7. The moving body indicator of claim 1 wherein the transmitting and receiving means comprise a singular metallized foil electret transducer, said transducer providing both receiving and transmitting means. A moving body indicator which will distinguish between approaching and receding bodies comprising:

a. a transducing means for transmitting a ultrasonic signal at a certain frequency, b. a transducingmeans for receiving the reflected portion of said transmitted signal from a body, one of said transducing means comprising an electrically charged polymer foil, a thin coating of metal on one side thereof to which an electrode is attached, a metal plate forming a backing for said foil, and an electrode attached to said metal plate, c. first mixing means for deriving a Doppler signal which is the difference in frequency between the transmitted and received signals, d. first phase shifting means for alternately producing a leading and lagging phase shift at a predetermined frequency smaller than the lowest expected Doppler frequency, e. second mixing means for deriving a Doppler signal which is the difference between the transmitter signal which has been phase shifted by said first phase shifting means and the received signal, f. second phase shifting means to shift the output of said second mixing means a predetermined amount, g. third phase shifting means to shift the output of said first mixing means a predetermined amount, h. correlating means for comparing the signals produced by said second and third phase shifting means and which will produce a signal of one polarity when said compared signals are out of phase and of the opposite polarity when said signals are in phase, i. measuring means connected to the output of said correlator to determine whether the signals compared to determine whether the signals compared by correlator means are in phase or out of phase.

j. alarming means connected to the output of said correlator means to give an alarm signal when said measuring means measures certain prescribed values.

9. The moving body indicator of claim 8 wherein the correlating means includes a first coil connected to the output of said third phase shifting means and fixed in position, a second coil connected to the output of said second phase shifting means and a force measuring means to indicate whether the signals of said first and second coils cause the coils to attract or repel each other.

10. The moving body indicator of claim 9 wherein the force measuring means includes a bimorph piezoelectric element that is attached to the second coil and which will produce a signal of aone polarity when the coils attract each other and a signal of the opposite polarity when the coils repel each other.

11. The moving body indicator of claim 10 wherein the first phase shifting means will alternately shift the signal by a value of $\pi/2$.

12. The moving body indicator of claim 11 wherein the second phase shifting means will delay the signal by $\pi/4$.

13. The moving body indicator of claim 12 wherein the third phase shifting means includes an A-C amplifier connected to amplify the signal produced by the piezoelectric element, an integrating circuit to integrate the output of the amplifier and a rectifier to change the integrated signal to a D-C signal, and meter means to measure the D-C signal and to indicate whether the body is approaching or receding from the moving body indicator.

* * * * *